United States Patent
Creamer et al.

(10) Patent No.: US 7,493,387 B2
(45) Date of Patent: *Feb. 17, 2009

(54) VALIDATING SOFTWARE IN A GRID ENVIRONMENT USING GHOST AGENTS

(75) Inventors: Thomas E. Creamer, Boca Raton, FL (US); Bill H. Hilf, La Habra, CA (US); Peeyush Jaiswal, Boca Raton, FL (US); Michael Mirt, Deerfield Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 843 days.

This patent is subject to a terminal disclaimer.

(21) Appl. No.: 10/666,323

(22) Filed: Sep. 19, 2003

(65) Prior Publication Data
US 2005/0066309 A1 Mar. 24, 2005

(51) Int. Cl.
*G06F 15/173* (2006.01)

(52) U.S. Cl. .................... 709/224; 709/238; 714/38; 717/124; 717/131

(58) Field of Classification Search ............ 709/224, 709/238; 714/38; 717/124, 131
See application file for complete search history.

(56) References Cited

U.S. PATENT DOCUMENTS

| | | | |
|---|---|---|---|
| 5,515,367 A | 5/1996 | Cox, Jr. et al. | |
| 5,655,081 A | 8/1997 | Bonnell et al. | |
| 5,802,296 A | 9/1998 | Morse et al. | |
| 5,966,441 A | 10/1999 | Calamera | |
| 5,974,567 A | 10/1999 | Dickson, Jr. et al. | |
| 6,038,399 A | 3/2000 | Fisher et al. | |
| 6,108,697 A | 8/2000 | Raymond et al. | |
| 6,108,703 A | 8/2000 | Leighton et al. | |
| 6,122,664 A * | 9/2000 | Boukobza et al. | 709/224 |
| 6,229,533 B1 | 5/2001 | Farmer et al. | |
| 6,269,330 B1 * | 7/2001 | Cidon et al. | 714/43 |
| 6,282,697 B1 * | 8/2001 | Fables et al. | 717/107 |
| 6,389,462 B1 | 5/2002 | Cohen et al. | |
| 6,513,159 B1 | 1/2003 | Dodson | |

(Continued)

OTHER PUBLICATIONS

Brann, J.J., et al., "Local Area Network Protocol for Autonomous Control of Attached Devices", IBM Tech. Disl. Bul., vol. 33, No. 2, pp. 288-294, (Jul. 1990).

"Ghost and Imagecast IC3, An Imaging Performance Comparison", ZDTag, (Jan. 1999).

Avery, M., "Symantec Ghost 6.5 Overcomes Weaknesses of Predecessor", Netowrking Computing, (Oct. 2, 2000).

"How to Troubleshoot a Ghost Network Boot Disk", Symantec, (Nov. 27, 2000).

*Primary Examiner*—Bunjob Jaroenchonwanit
*Assistant Examiner*—Thomas J Dailey
(74) *Attorney, Agent, or Firm*—Akerman Senterfitt (57) ABSTRACT

A validation method can include the step of identifying a host within a grid environment, wherein the host is a software object. A ghost agent can be associated with the host, where the ghost agent can move within the grid environment. The actions of the host can be replicated by the ghost agent. Data related to the replicated actions can be compared with validation data. Validation output can be generated based upon the comparison.

9 Claims, 4 Drawing Sheets

U.S. PATENT DOCUMENTS

| | | | |
|---|---|---|---|
| 6,564,342 B2 * | 5/2003 | Landan | 714/48 |
| 6,681,243 B1 * | 1/2004 | Putzolu et al. | 709/202 |
| 2002/0112048 A1 * | 8/2002 | Gruyer et al. | 709/224 |
| 2004/0064548 A1 | 4/2004 | Adams et al. | |
| 2004/0103195 A1 * | 5/2004 | Chalasani et al. | 709/226 |
| 2004/0103339 A1 * | 5/2004 | Chalasani et al. | 714/4 |
| 2004/0139202 A1 * | 7/2004 | Talwar et al. | 709/229 |
| 2004/0225711 A1 * | 11/2004 | Burnett et al. | 709/201 |

* cited by examiner

VALIDATING SOFTWARE IN A GRID ENVIRONMENT USING GHOST AGENTS

BACKGROUND

1. Field of the Invention

The present invention relates to the field of computer software and, more particularly, to validating software objects within a grid environment.

2. Description of the Related Art

The majority of significant software projects conducted today are complex undertakings involving large teams of software developers with individual teams focusing on discrete project tasks. Each of these teams can operate in a semi-autonomous fashion and can utilize different software development tools, languages, and techniques. To integrate the various components of software projects, a variety of documents that include interface documents, requirements documents, and performance specifications are developed. While these configuration documents are typically complete and generally followed, sometimes deadlines result in implementation shortcuts as well as undocumented and/or unrecognized component requirements or shortcomings. The majority of the structural discrepancies are relatively benign and do not result in problematic behavior.

A portion of structural discrepancies, however, do cause unexpected system behavior, which is sometimes referred to as software glitches or software bugs. These bugs can be very difficult to detect, fix, and verify, especially when the bugs occur within geographically dispersed software. Geographically dispersed software can be defined as software with multiple components spread throughout multiple physical locations. A grid environment is an example of a computing environment where software is installed and utilized in a geographically disperse manner.

The grid environment can be a distributed computing environment where computing, application, storage, and/or network resources can be shared across geographically disperse organizations. An ideal grid computing environment can permit flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid computing environment, such as Avaki's data grid from Avaki of Burlington, Me. and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

A grid computing environment can include multiple applications. Each application can include a set of computing resources that performs a series of related tasks. Examples of applications include, but are not limited to, word processors, database programs, Web browsers, development tools, drawing applications, image editing programs, and communication programs. The various computing resources for one application can be distributed across several different grids within a grid computing environment, wherein each grid can contain a myriad of diverse hardware components, such as communication lines, networking routers, servers, workstations, peripherals, intranets, and the like.

Testing and validation can be especially important within a grid environment because problems with one grid-enabled application can have cascading effects upon other applications. That is, since many different grid-enabled applications can share pooled resources, one malfunctioning application feature that overly consumes needed resources can affect multiple applications that share the commonly utilized resources. The interdependencies that exist among applications in a grid environment, however, make testing and validating individual applications and system components extremely difficult.

Conventional methods for validating grid-based software involve extrapolation. Extrapolation methods record small, finite, measurable increments of system resources. The recorded increments are applied to an extrapolation algorithm in order to verify that software within a grid location is functioning properly. This verification, however, is generally performed at the level of discrete software objects and based upon system variables and hardware that particular software objects affect. Unfortunately, many different sources and applications can utilize the verified software object. Accordingly, conventional extrapolation methods are inadequate for accurately validating discrete code segments within the context of a particular application or usage.

SUMMARY OF THE INVENTION

The present invention provides a method, a system, and an apparatus for validating software within a grid environment. More specifically, the method can compare actions executed by a designated software agent with criteria loaded into a ghost agent. The software agent can be called a host, and the ghost agent can be associated or bound to the host. The actions of the host can be replicated for use by the associated ghost agent. Comparisons can then be performed based upon the replicated actions. Since the replicated actions are separate from the host actions, and since validation operations involve manipulations and analysis of the replicated actions instead of the host actions, the validation operations specified herein can be performed in a passive fashion. Accordingly, the actions executed by the host can be substantially unaffected by the validation operations performed by the ghost agent; even if those validation operations require the manipulation of the replicated actions in a fashion that alters the replicated actions.

A variety of different validation operations can be performed by the ghost agent. For example, one or more test routines can be loaded into the ghost agent and compared to one or more replicated actions or portions thereof that correspond to the test routines. In such an example, the resulting test outputs, quantities of consumed computing resources, performance characteristics, and the like can be compared with the equivalent metrics for the replicated actions. In an alternative example, performance specifications and/or system load requirements can be loaded into the ghost agent. The replicated actions can then be executed and compared against the loaded requirements. Additionally, the ghost agent can monitor system hardware data that is unrelated to the replicated actions, but is instead related to the operationally executed actions. Validation reports can be generated by the ghost agents and can be conveyed to a centralized location. Further, multiple different ghost agents can be synchronized with one another to validate transactions spanning multiple hosts.

One aspect of the present invention can include a validation method that can include the step of identifying a host within a grid environment, where the host is a software object. A ghost agent can be associated with the host. The host can move within the grid environment and the ghost agent can responsively move in accordance with the movement of the host. Movement in a grid environment refers to the movement from one grid component to another component within a grid and/or movement from one grid to a different grid of the grid environment. The actions of the host can be replicated by the ghost agent.

Data related to the replicated actions can then be compared with validation data. Validation data can include, but is not limited to, one or more performance specifications, one or more resource utilization specifications, one or more load specifications, and one or more test outputs. Validation output can be generated by recording data relating to the comparison of the replicated actions to the validation data. For example, at least one performance metric can be determined for one or more replicated actions. The performance metric can be compared to a performance specification provided by the ghost agent. In another example, at least one resource utilization metric can be determined for one or more replicated actions. The resource utilization metric can be compared to a resource utilization specification provided by the ghost agent. In yet another example, at least one load metric resulting from the execution of a replicated action can be determined. The load metric can be compared to a load specification provided by the ghost agent. In still another example, a test routine can be executed to generate test output. The execution of the test routine can occur within the ghost agent. An output for at least one replicated action can be determined and compared against the test output.

Validation output can be generated based upon the comparison between the validation data and the replicated action data. Additionally, a location for recording validation data can be identified and the validation output can be conveyed to the identified location. In one embodiment, the identified location can be external to the ghost agent. In another embodiment, a validation command can be received from a source that is external to both the host and the ghost agent. At least one operation can be performed within the ghost agent in response to the validation command. In yet another embodiment, multiple hosts can be selected and ghost agents can be associated with each selected host. The ghost agents can replicate the actions of the host, perform validation comparisons, and generate validation output.

Additionally, when the validation data is compared to data relating to the replicated actions, the ghost agent can determine whether validation criteria have been satisfied. Accordingly, a compliance indicator can be included within the validation output based upon the results of the above determination. For example, if the validation criteria specifies that an action be performed in X seconds or less, the actual time for executing the action can be determined and compared against X. A pass or failure indicator can result. The invention can automatically generate statistics showing the number of actions executed and resulting ratios of passes and failures.

Another aspect of the present invention can include a system for validating data. The system can include several hosts and one or more ghost agents associated with the hosts. The hosts can be software objects distributed within multiple locations within a grid environment. Each ghost agent can compare validation data with data relating to its associated host. The ghost agents can also move within the grid environment. If a host moves from one grid within the grid environment to another, the ghost agents can move accordingly. The system can also include a validation application. The validation application can manage validation operations performed by the ghost agents. A validation interface can permit authorized users of the validation application to access the features of the validation application. A test application that manages test operations performed by the ghost agents can be provided. Further, a validation data store can record validation output generated by the ghost agents.

Another aspect of the present invention can include a ghost agent that includes a validater, a ghost controller, a ghost identifier, a ghost log, and/or a test engine. The ghost agent can also include an interface for associating the ghost agent with a host. Additionally, the ghost agent can move within a grid environment to follow the movements of the host. The validater can compare validation data with data relating to the host. The ghost controller can manage interactions between the ghost agent and the grid environment. The ghost identifier can identify the ghost agent to components within the grid environment. The ghost log can record validation output. The test engine can manage test routines. A means for disassociating the ghost agent from the host can be provided as well as a means for associating the ghost agent with a different host.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a method, a system, and an apparatus for utilizing ghost agents to validate software objects. More specifically, a ghost agent can be associated with a software object called a host. The actions of the host can be replicated to be used by the ghost agent. The ghost agent can then analyze the replicated actions and compare the results of the analysis to specified criteria. For example, system performance requirements can be specified within the ghost agent and compared against the performance of the replicated actions. The invention can be used to verify and validate software objects within a production environment as well as software objects disposed within a test environment. Further, test routines can be executed by the ghost agents disposed in either a production or a test environment. Test routine results, load specifications, performance requirements, and/or resource utilization specifications inputted within the ghost agent can be compared against corresponding metrics relating to the host actions and the replicated actions.

As used herein, a ghost agent can be a self-managing, self-identifying software object capable of performing predefined tasks in a self-sufficient manner. Any suitable technique can be used to attach the ghost agent to the host including, but not limited to, debugging attachment techniques, system calibration techniques, hardware performance testing techniques, and similar binding methodologies.

Ghost agents can be used in either an active or a passive fashion. A ghost agent that does not have an operational effect upon the grid environment can be referred to as a passive or "read-only" ghost agent. A passive ghost agent can passively record the actions of a host and/or execute test routines that have no operationally significant effect upon a production environment in which actions of the hosts are executed. Another type of ghost agent, an active ghost agent, can perform actions that have an operational effect upon the grid environment. For example, an active ghost agent can be used to induce a fault state so that fault tolerance features of an application can be tested and verified. In general, an active ghost agent can selectively prevent a host from performing one or more actions, can delay the actions of a host, can modify one or more host actions, and/or can initiate new actions.

Figure 1:
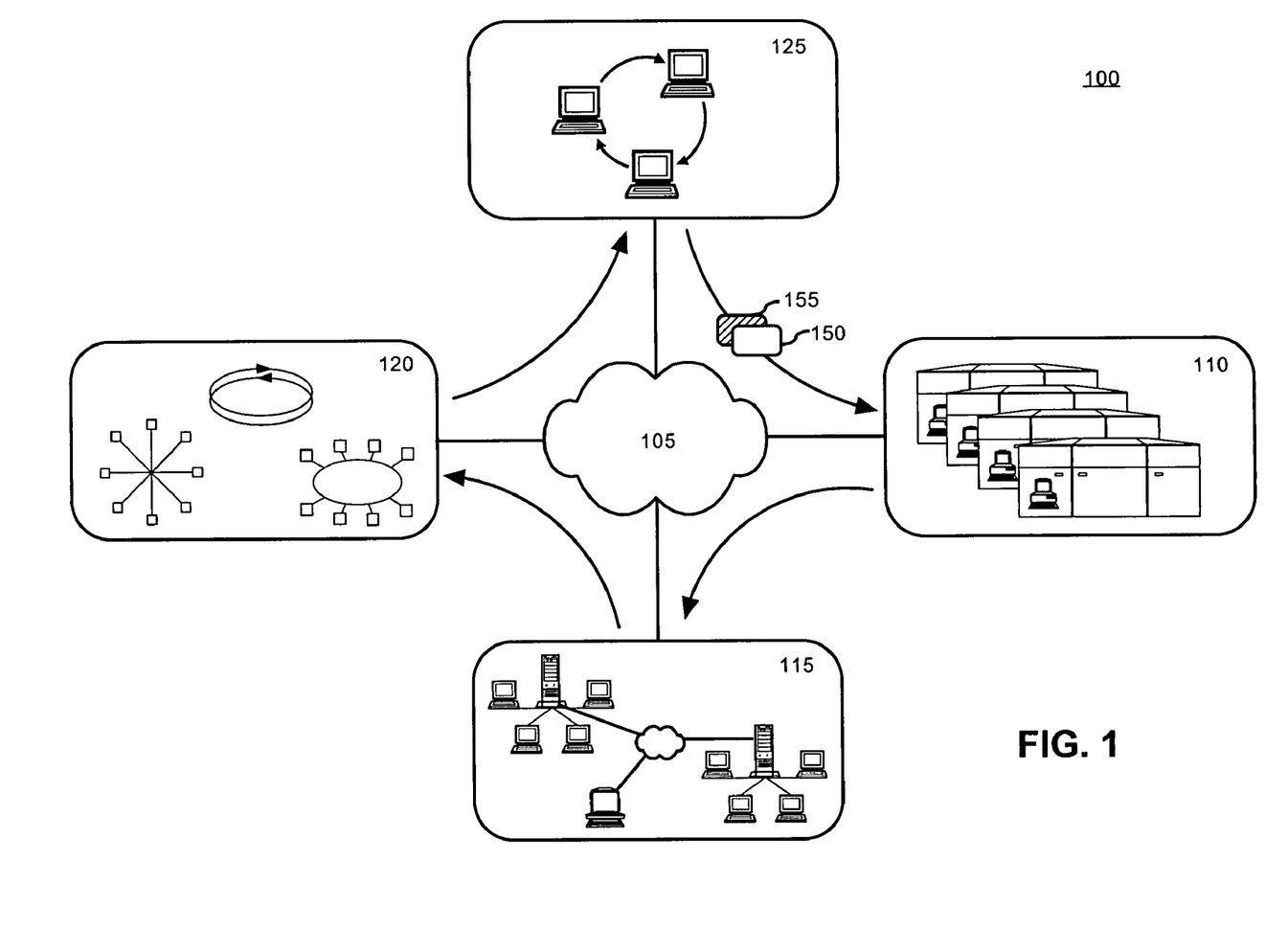
FIG. 1 is a schematic diagram illustrating an exemplary grid environment enabled for ghost agents and hosts in accordance with the inventive arrangements disclosed herein.

FIG. 1 is a schematic diagram illustrating an exemplary grid environment 100 enabled for ghost agents and hosts in accordance with the inventive arrangements disclosed herein. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

As used herein, computing resources can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The grid environment 100 infrastructure can include components that utilize any hardware platform, operating system, storage scheme, and software resource. In order to be integrated within the grid environment 100, each computing component can be communicatively linked to the grid environment 100 through the network 105. Each computing component can also adhere to the standards and protocols defined within the architecture of the grid environment 100. The grid environment 100 can include one or more grids, such as grids 110, 115, 120, and 125, communicatively linked to one another through a network 105. Each grid can represent a grouping of physically differentiable hardware resources.

The grid 110 can include a multitude of mainframe or supercomputers. The grid 115 can include several local area networks, workgroups, and computing arrays. The grid 120 can include computing resources arranged according to any topography including, but not limited to, star topographies, Fiber Distributed Data Interface (FDDI) rings, token rings, and the like. The grid 125 can include one or more peer-to-peer networks. One of ordinary skill in the art can appreciate that the invention is not to be limited in this regard, that any hardware resources, topography, and software can be included in the grid environment 100, and that such arrangements are contemplated herein.

Host 150 can be a software object capable of moving within the grid environment 100. For example, the host 150 can move from grid 110 to grid 115 or from grid 120 to grid 125 to grid 115. The host 150 can also move from one location within a grid to another location. For example, the host 150 can move from one workgroup in grid 115 to a different workgroup in grid 115. Whenever the host 150 moves, the associated ghost agent 155 can move accordingly. Thus, the ghost agent 155 can perform testing operations related to the associated host 150 in a location independent fashion.

One illustrative example of ghost agents 155 operating within a grid environment 100 can relate to a Massive Multi-Player Gaming (MMPG) system. Each player of the MMPG system can be represented by a host 150 that responds to user instructions and interacts with the gaming environment. While playing the MMPG, players can move from one game play area to another, thereby moving the host 150 within the grid environment 100. Ghost agents 155 can be attached to selected players and can move within the grid environment 100 according to the movements of the host 150. The ghost agents 155 can perform one or more validation operations that can be triggered from a validation application and/or based upon actions of the attached players.

For example, if a number of players experience erratic behavior when campaigning in a suspect area of the MMPG, ghost agents 155 can be attached to players at the onset of adventures into the suspect area. The ghost agents 155 can include validation data, such as performance requirements that can be compared against operational metrics resulting from player actions. Test routines can also be loaded into ghost agents 155 that represent proposed solutions to the problems being experienced. The output of the test routines can be compared against host action output. Output from the comparisons can be generated and conveyed to a centralized data store for validation output.

In further example, a performance requirement for a designated MMPG action, such as an attack, can be inputted into the ghost agent 155. When the player triggers the designated attack, the system response time for the attack can be determined. This time can be compared against the inputted performance requirement using the ghost agent 155. Further, a compliance indicator can be generated that denotes whether the performance requirement was satisfied or not. The compliance indicator and other validation output can be recorded for the attack and conveyed to an appropriate location.

Moreover, a resource utilization requirement for the designated attack can be inputted into the ghost agent 155. A quantity of computing resources consumed to execute software routines for the attack can be determined. This resource consumption can be compared against the inputted resource utilization requirement using the ghost agent 155. Validation output for the comparison can be generated and conveyed to an appropriate location.

Additionally, a system load requirement for the designated attack can be inputted into the ghost agent 155. A system load existing during the attack's execution can be determined and compared against the system load requirement. Validation output can be generated based upon this comparison. Many reasons can exist for needing this system load validation output. For example, developers can be deciding whether the designated attack should result in a more robust MMPG effect, such as having a victim scream in pain and visually rendering the victim as being physically harmed by the attack. The increased MMPG effect, however, can increase the load upon the MMPG system. Accordingly, the validation performed by the ghost agent 155 can determine whether the more robust MMPG effect can be implemented with existing system components or whether a system upgrade would be needed to implement the enhanced effect.

Validation operations and test routines executed by the ghost agent 155 can have substantially no effect on the actions executed by the host 150. Accordingly, game play for the MMPG for players with ghost agents 155 can be approximately the same as game play for players without ghost agents 155. Additionally, validation and testing of the ghost agent 155 is not always halted whenever an error is encountered. Instead, error results can be recorded as validation output and the validation operations can continue to be executed responsive to player activity. The above MMPG example is just one possible application within which tests and validation operations can be performed by ghost agents 155 and the invention is not limited in this regard.

Figure 2:
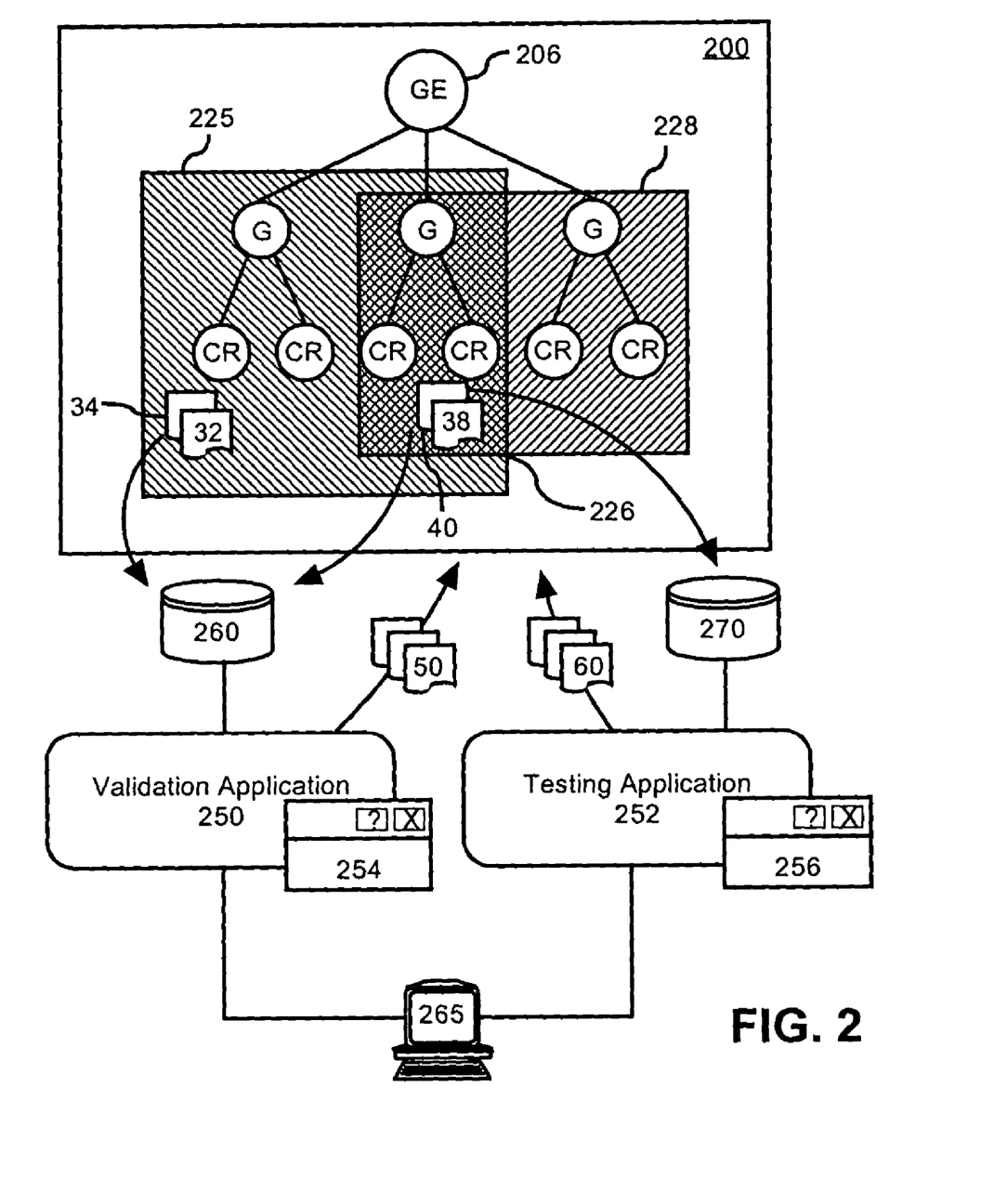
FIG. 2 is a schematic diagram illustrating a system in which a centralized validation application can validate grid-based applications in accordance with the inventive arrangements disclosed herein.

FIG. 2 is a schematic diagram illustrating a system in which a centralized validation application 250 can validate grid-based applications in accordance with the inventive arrangements disclosed herein. The system can include a validation application 250, a testing application 252, a stand-alone computer 265, a validation data store 260, a test data store 270, and a grid environment 200. The validation application 250 can be a software maintenance tool configured to validate and/or verify software fixes, the load induced by software upon a system, and software performance characteristics. Additionally, the validation application 250 can manage validation operations and resulting data for multiple ghost agents deployed within the grid environment 200. The validation application 250 can also execute within a standalone computer 265, which can be a stand-alone computing device not deployed within the grid environment 200.

When the validation application 250 operates within the grid environment 200, validation commands 50 can be directed toward designated ghost agents 34 and 40 disposed throughout the grid environment 200. The validation commands 50 can trigger the ghost agents 34 and 40 to execute validation operations. The validation commands 50 can also include validation data used as input by the ghost agents 34 and 40. The validation operations can result in validation output which can be conveyed to the validation data store 260. Further, the validation application 250 can access the validation data store 260 and retrieve the validation output. A validation interface 254 can be provided so that authorized users can access the features of the validation application 250.

The testing application 252 can be a software development tool configured to test applications within test grid-environments and within production grid environments. The testing application 252 can function in conjunction with the validation application 250, thereby allowing test routines to first be executed and verified. Like the validation application, the testing application 252 can operate within the grid environment 200 as well as the stand-alone computer 265. The testing application 250 can also include a test interface 254 that permits authorized users to access the functionality of the testing application 250. Additionally, the testing application 250 can issue test commands 60 that can be conveyed to ghost agents 34 and 40 to produce test output. The test output can be conveyed to the test data store 270.

The grid environment 200 is illustrated as a series of nodes and applications spanning these nodes. The grid environment 200 includes a root node 206, labeled "GE" for grid environment. The root node 206 can include one or more different grids, where each grid is represented by a node labeled "G." Each grid can further provide one or more computing resources, represented by nodes labeled "CR." The computing resources can be pooled into the resource pool and be utilized by various grid users on demand.

Application domains 225 and 228 can exist within the grid environment 200, each functioning as a "virtual application." Unlike traditional applications that generally reside on a single server, application domains 225 and 228 can physically span across several grids and grid components, yet logically function as a single application having a single user interface. Each application domain can utilize several different computing resources. Additionally, a set of computing resources can be utilized by more than one application domain. For example, application domain 225 and application domain 228 share a portion of computing resources labeled shared segment 226. Exemplary types of application domains 225 and 228 can include productivity applications, entertainment applications, development applications, office applications, utility applications, multimedia applications, data management applications, graphic design applications, and the like.

Application domains 225 and 228 can utilize hosts 32 and 38 to perform application specific actions. Ghost agents 34 and 40 can replicate, record, test, and validate the actions of the hosts 32 and 38. Ghost agents 34 and 40 can be passively as well as actively executed.

In operation, a user can utilize the validation interface 254 to access the validation application 250. The validation application 250 can visually present ghost agent 34, ghost agent 40, and every other ghost agent disposed within the grid environment 200. The user can select the ghost agent 34 and can establish validation data for the ghost agent 34 using the validation interface 254. The user-entered validation data can be conveyed to ghost agent 34 using validation commands 50. The ghost agent 34 can also receive other validation commands 50 in order to direct the ghost agent 34 to perform desired comparisons. The comparisons can result in validation output, which can be conveyed to the validation data store 260.

In one embodiment, a validation command 50 can cause the ghost agent 34 to perform a comparison operation every time a selected action is executed by the ghost agent 34. For example, a performance metric can be determined for the selected action and compared against an inputted performance specification. A validation command 50 can also cause a single comparison to be performed from time to time or on a periodic basis. For example, a ghost agent 34 can be associated with a hardware device driver to monitor activities of a selected hardware device. The ghost agent 34 can determine a load upon for the associated hardware device every $n^{th}$ second. The ghost agent 34 can then compare the determined load against an inputted load threshold.

In a further embodiment, a user can utilize the test interface 256 to access the testing application 252. Once an instance of the test interface 256 is open, the application domain 225 can be chosen from a selection of application domains. The procedures, methods, parameters, and graphical user interface (GUI) views of the application domain 225 can be presented within the test interface 256. The user can select a presented software object and generate a test routine for it. Subsequently, the generated test routines can be executed. For example, a test routine can include a driver and a stub written for a particular procedure. The test routine can be executed in place of or in addition to the procedure for which it was written.

The validation application 250 can be used to perform comparisons between test output using ghost 34 and the output resulting from host 32 executed actions. Further, performance metrics, resource utilization metrics, and load metrics can be determined by analyzing the test actions and the host actions. The validation application 250 can compare the metrics of the test actions with the metrics of the host actions. For example, an execution time can be determined for both the test action and the host action. These execution times can be compared with one another.

It should be noted that test routines written using the testing application 252 can be enabled when the application domain 225 is executed in a test mode, yet can be disabled when the application domain 225 is executed in a production mode. Further, the test mode can refer to actions executed by the ghost agents 34 and 40. The production mode can refer to actions executed by the hosts 32 and 38. Host actions can be executed by the hosts 32 and 38 at the same time that replicated actions, which can be modified by test routines, are executed by the ghost agents 34 and 40. Accordingly, the application domain 225 can simultaneously operate in a production mode and a test mode without the test mode interfering significantly with the production mode.

Figure 3:
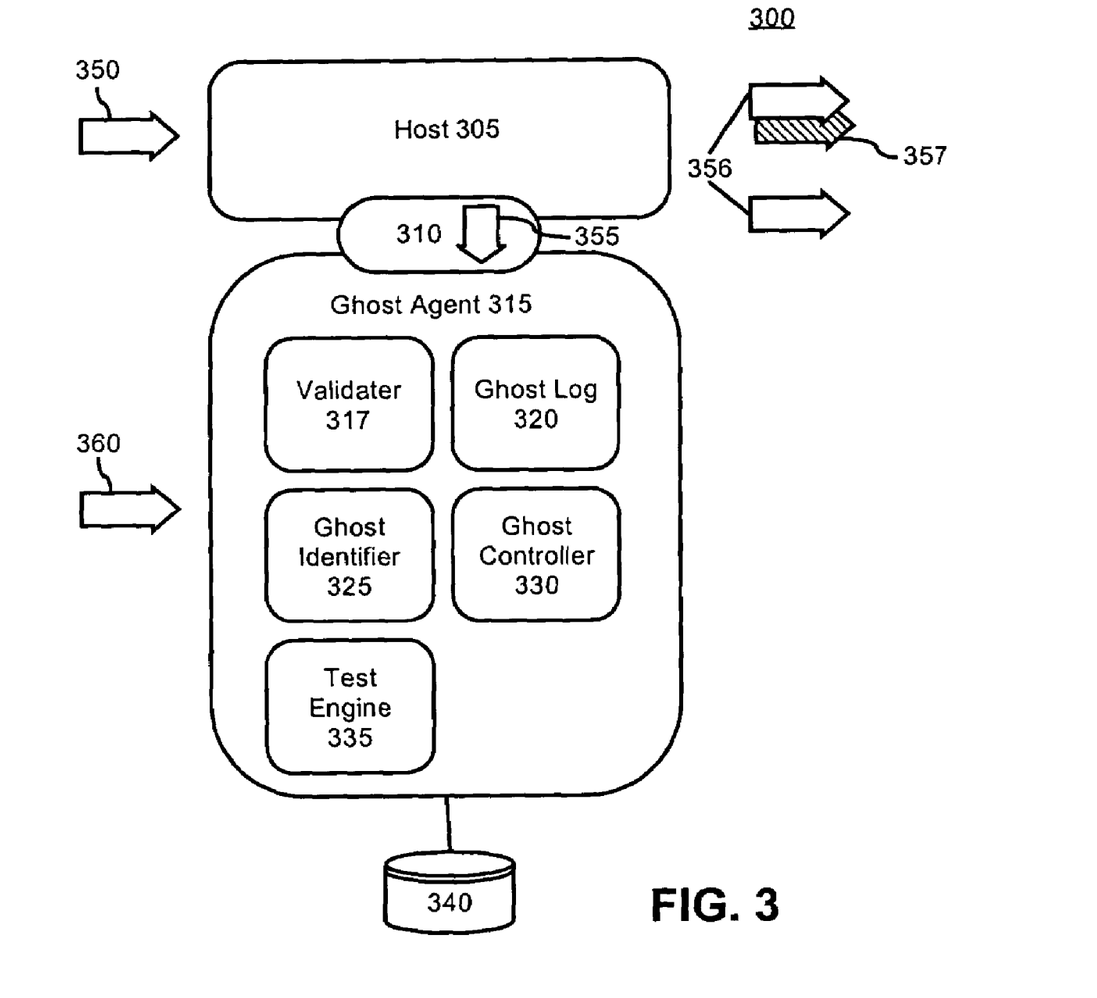
FIG. 3 is a schematic diagram illustrating a host and a ghost agent within a grid environment in accordance with the inventive arrangements described herein.

FIG. 3 is a schematic diagram illustrating a host 305 and a ghost agent 315 within a grid environment 300 in accordance with the inventive arrangements described herein. The host 305 can be any definable software unit within the grid environment 300 that can receive input 350 and execute actions 356. The input 350 can include messages of any type conveyed to the host 305, such as keyboard input, procedural calls, and the like. The actions 356 can be relatively high-level actions as well as low-level actions. High-level actions can include calls to software routines that can contain one or more external procedural calls. Low-level actions can include hardware device calls and the execution of one or more processes or threads.

The ghost agent 315 can be associated or bound to the host 305 though the ghost interface 310. The ghost interface 310 can generate replicated actions 355 that are copies of the actions executed by the host 305, using any of a variety of suitable techniques. For example, techniques used by software debugging programs to attach monitors to running programs in order to evaluate system behavior and step through code can be used by the ghost interface 310. Alternatively, techniques used by system calibration and hardware performance testing utilities can be used by the ghost interface 310 to bind the ghost agent 315 with the host 305. Further, operating system level commands, tools, and functions analogous or similar to the UNIX commands "strace" and "ptrace," can potentially be used by the ghost interface 310 to bind the host 305 with the ghost agent 315. Strace is a commonly used system call trace, i.e. a debugging tool that prints out a trace of all the system calls made by another process and/or program. Additionally, ptrace is a commonly used system call that enables one process to control the execution of another. Ptrace also enables a process to change the core image of another process.

The ghost agent 315 can manipulate the replicated actions 355 in order to utilize data gathered from the replicated actions 355 when executing test routines. The replicated action 355 can be a passive or "read only" action that has no operational effect upon the grid environment 300. Accordingly, the passive action can be stored and not rebroadcast or sent into the grid environment 300 to be executed. For example, a passive action can involve analyzing a replicated action to determine performance metrics, resource utilization metrics, and/or estimated load metrics relating to the replicated action. In another example, a passive action can involve executing a test routine within the ghost agent 315 generating test output.

The ghost agent 315 can also generate one or more active actions 357 that are executed within the grid environment 300. Active actions 357 can be used to place a system in a selected state so that the selected state can be tested. While active actions 357 can be commonly used by ghost agents 315 disposed within a test segment of the grid environment 300, active actions 357 can also be used within production segments of the grid environment 300. For example, an active action 357 can trigger a fault condition in order to validate fault-reporting features and/or error handling routines of a system. When used within production segments, however, care must be taken to assure the active actions 357 are not harmful to users of the grid environment 300.

In one embodiment, the ghost agent 315 can receive control signals 360 from an external source, such as a test application. The control signals can include messages used for testing as well as general messages used to control the ghost agent 315. For example, the control signal 360 can specify a test routine that is to be executed. In another example, a control signal can include validation specifications. Additionally, the control signal 360 can synchronize multiple ghost agents 315 with one another for validation activities that involve multiple ghost agents 315. Alternatively, control signals can cause a ghost agent 315 to associate and/or disassociate with a host 305, can alter the level of logging performed by the ghost agent 315, can cause the ghost agent 315 to terminate, and can similarly control the ghost agent 315.

The ghost agent 315 can include a validater 317, a test engine 335, a ghost log 320, a ghost identifier 325, and a ghost controller 330. The validater 317 can compare data related to the replicated action to validation data. For example, the validater 317 can analyze a replicated action 355 as well as other system input to determine performance metrics, resource utilization metrics, load metrics, and/or output resulting from actions of the host 305. This data can be compared against corresponding validation data, which can include performance requirements, resource utilization specifications, and load specifications inputted into the ghost agent 315 as well as test output generated by the ghost agent 315.

For example, in one arrangement, the validation data input into the validater 317 can include a time threshold for executing a designated action. In such an arrangement, the validater 317 can determine a time required to execute a corresponding host 305 action. The validater 317 can then compare the time threshold to the determined time. Further, the validater 317 can indicate whether the time threshold has been exceeded or not. Accordingly, part of the validation output produced by the validater 317 can include a compliance indicator detailing this result.

In another arrangement, the validation data input into the validater 317 can include a resource threshold for resourced consumed by the designated action. In such an arrangement, the validater 317 can determine resources consumed by an action and compare the determined value to the resource threshold. In yet another arrangement, the validation data input into the validater 317 can include a system load threshold. In such an arrangement, the validater 317 can determine a system load when the host 305 executes an action and compare the determined value to the system load threshold.

The test engine 335 can load test routines into the ghost agent 315, can execute the test routines, and can generate test output. The execution of the test routines can result from receiving test commands that trigger one or more test operations. Test routines can also be automatically executed based upon the occurrence of a monitored event. For example, if a particular replicated action 355 is received, the test engine 335 can responsively execute a test routine.

When executing test routines, the test engine 335 can analyze, manipulate, and extract data from the replicated actions 355. For example, a test routine may require one or more parameters that can be extracted from one or more replicated actions 355. Test routines can also be executed in combination with other test routines and/or replicated actions 355.

For example, a replicated action 355 can trigger three sequentially executed procedures specified as module A, B, and C. A particular test routine, called module $B^{TEST}$, can be a replacement for the second procedure, B. Accordingly, when the test engine 335 executes replicated action 355, module A, $B^{TEST}$, and C can be sequentially executed.

The ghost log 320 can record the data relating to the replicated actions 355 and the operations of the validater 317 and test engine 335, thereby creating a log. The ghost log 320 can be configured to record all activities relating to the associated host 305 or can be configured to record only selected activities. For example, in one embodiment, the ghost log 320 can record only those comparisons of the validater 317 where specifications are not met, thereby generating a problem log. In another example, the ghost log 320 can record a statistically relevant portion of actions, such as recording data relating to every $n^{th}$ replicated action 355 or every $n^{th}$ validation comparison. The ghost log 320 can also capture system information and add annotations from this system information to the generated log.

For example, system clock information can be captured and used to annotate the time between receiving a replicated action 355 and the completion time for an associated active action 357. Operational metrics, including load metrics, for the replicated action can be gathered in this fashion. In another example, metadata information contained within message flows, such as input 350, and active action 357, can be recorded and/or utilized by the ghost log 320. Additionally, the ghost log 320 can time stamp data relating to replicated actions 355.

The ghost log 320 can also record the log information in a ghost log repository 340. The ghost log repository 340 can be a temporary buffer or a persistent data storage area. If the ghost log repository 340 is external to the ghost agent 315, any of a variety of different mechanisms can be utilized to convey the log data to the ghost log repository 340.

For example, an intermittent communication link, such as a unicast or a point-to-point communication link can be established between the ghost log 320 and the ghost log repository 340 through which data can be conveyed. In another example, a buffer space, which can be another embodiment of ghost log 320, within the ghost agent 315 can record log information. Whenever the buffer reaches a specified volume of data, a message containing the buffered information can be conveyed to the ghost log repository 340. The buffer within the ghost agent 315 can then be cleared and used to store fresh data.

In yet another example, ghost agents 315 can convey log data to a local data server. The local data server can then convey all received log data to the ghost log repository 340 from time to time or on a periodic basis. In still another example, the ghost agent 315 can intermittently deposit log data to a local location. Then a data-reaping object can gather packets of the log data that have been locally deposited by the various ghost agents 315. The packets of log data can be conveyed to the ghost log repository 340 by the data-reaping objects.

The ghost identifier 325 can provide identification, authorization, and security related functions for the ghost agent 315. That is, the ghost identifier 325 can identify the ghost agent 315 to the various components of the grid environment 300. Accordingly, servers in the grid environment 300 can have an awareness of the ghost agent 315. The grid servers can then use policy-based controls to manage permissions, authentication, resource utilization, and security for the ghost agents 315. Ghost agents 315 adhering to the established policies can be permitted to automatically enter and exit the various grids of the grid environment 300.

The ghost agent 315 can be granted different access privileges to computing resources as the ghost agent 315 traverses from one grid in a grid environment 300 to another depending on grid-based policies. Privileges afforded the ghost agent 315 can be determined in any manner known in the art. For example, a ghost agent 315 can replicate the passwords provided by the host 305 and use the replicated passwords to provide authentication to the grid environment 300. In another example, before a ghost agent 315 can be permitted to follow an associated host 305 from one grid in the grid environment 300 to the next, a password or digital certificate unique to the ghost agent 315 can be required. The ghost agent 315 can receive the same system privilege level with the grid environment 300 as the host 305 or can receive a different privilege level.

The ghost controller 330 can manage the ghost agent 315. For example, the ghost controller 330 can establish a life span for a particular ghost agent 315 so that the ghost agent 315 self-terminates after a designated period. In another example, the ghost controller 330 can restrict the computing resources consumed by the ghost agent 315, thereby freeing up system resources in the grid environment 300 for improved operational performance. Alternately, the ghost controller 330 can increase the computing resources consumed by the ghost agent 315, thereby slowing down operational performance in the grid environment 300. Slowing performance can be beneficial when simulating a load during testing.

In one embodiment, the ghost controller 330 can accept control signals 360 from an external source. Further, the ghost controller 330 can include a listener object capable of responding to particular events broadcasted by a corresponding notifier object. For example, a server could broadcast a signal causing all ghost controllers 330 to limit the resource consumption of all ghost agents 315 presently disposed in the server. Similarly, a grid wide broadcast could cause specified ghost agents 315 to self-terminate.

While ghost log repository 340 is depicted as being external and possibly remotely located from the ghost agent 315, it should be appreciated that the ghost log repository 340 can also be an allocated memory space internal to the ghost agent 315. For example, the ghost log repository 340 can be a dynamically allocated segment of random access memory (RAM) available to the ghost agent 315 as needed.

It should be noted that there are many possible ways to implement the elements of system 300. Implementation details can depend upon the conditions of the host 305, the specifics of the ghost agent 315, and details concerning the grid environment 300 itself. One of ordinary skill in the art can apply the teachings disclosed herein to a variety of different conditions using well known software engineering techniques and principles.

For example, the details of the test engine 335 can depend upon implementation choices. In one embodiment, the host 305 can execute actions A, B, and C by calling three separate external routines; call A, call B, and call C, respectively. The ghost agent 315 can determine the routine calls by examining the replicated actions 355 that correspond to the calling actions. In one arrangement, drivers and stubs can be written for call A, call B, and call C. The drivers and stubs can be executed by the test engine 335 so that the test engine 335 need not externally call routines A, B, and C. In another arrangement, the test engine 335 can perform calls to the external routines, but an indicator can be relayed to the external routines to prevent operational changes from occurring. That is, each of the external routines can be executed in a disabled mode. In yet another arrangement, substitute routines for routines A, B, and C can exist and be called by the test engine 335 in place of calling A, B, and C. For instance, the substitute routines can be implemented within a test environment and can be approximately equivalent to their counterparts that are implemented within a production environment. In another arrangement, the host 305 can execute actions A, B, and C using internal routines. The internal routines will generate actions that are copied into the ghost agent 315 as replicated actions and can be directly executed by the test engine 335.

Figure 4:
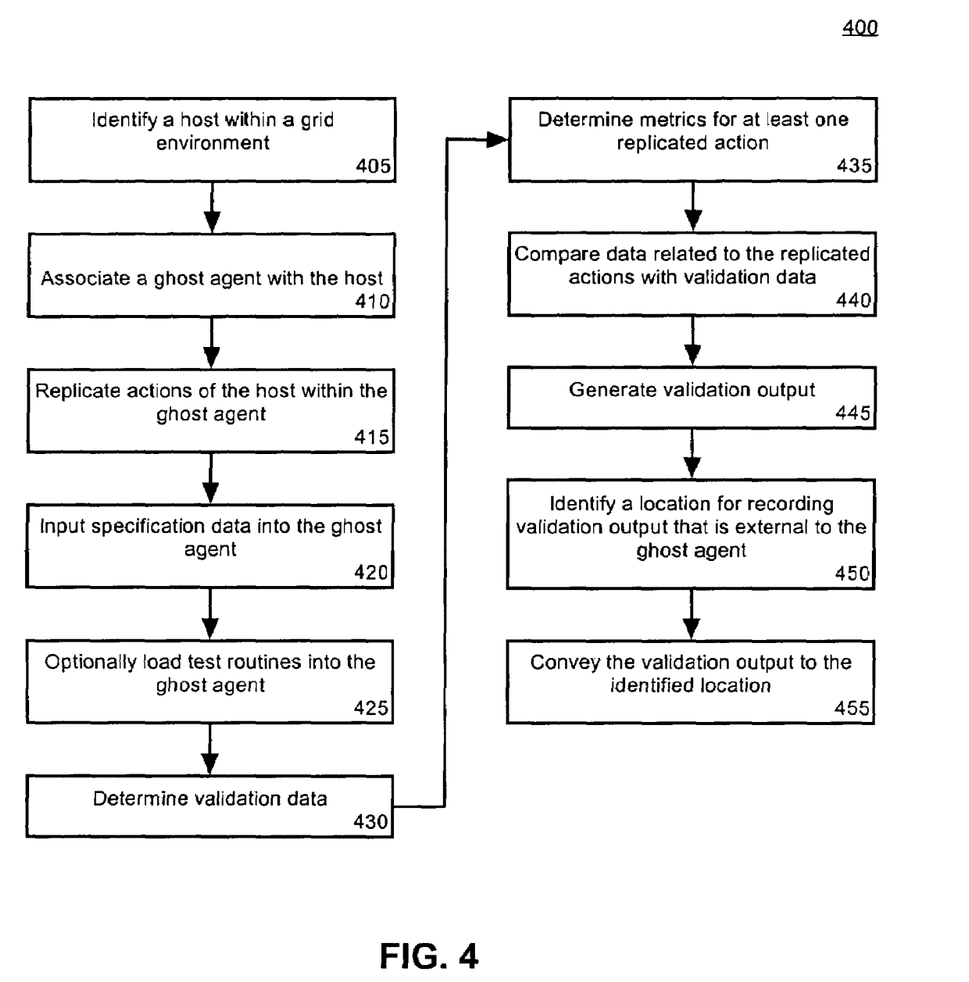
FIG. 4 is a flow chart illustrating a method for validating specification information using ghost agents according to the inventive arrangements disclosed herein.

FIG. 4 is a flow chart illustrating a method 400 for validating specification information using ghost agents according to the inventive arrangements disclosed herein. The method 400 can be performed in the context of a grid environment containing host software objects and ghost agents as described herein. The method can begin in step 405, where a host can be identified within the grid environment in order to perform one or more validation operations relating to the identified host. In step 410, a ghost agent can be associated with the identified host. In step 415, the actions of the host can be replicated by the ghost agent.

In step 420, specification data can be inputted into the ghost agent. The specification data can derive from a variety of sources. For example, messages can be transmitted to the ghost agents that contain specification information. Alternatively, the ghost agent can retrieve specification information from a designated data source, such as an external database. In another example, the ghost agent can be programmed with algorithms for determining specification information based upon system data. The method 400 is not limited in this regard and any inputting means resulting in specification data being loaded into the ghost agent is contemplated herein.

In step 425, test routines can optionally be loaded into the ghost agent. This occurs only if a replicated action is being compared with a test routine in some fashion. In step 430, validation data can be determined from the specification data and/or the test routines. Validation data can include performance specifications, resource utilization specifications, load specifications, test output, and the like. In step 435, metrics can be determined for at least one replicated action. These metrics may require analysis, execution, and manipulation of the replicated actions as well as other system input, such as timing information. In step 440, data related to the replicated actions can be compared with validation data. In step 445, validation output reporting the results of the comparison can be generated. In step 450, a location for recording validation output can be identified. This location can be external to the ghost agent. In step 455, the validation output can be conveyed to the identified location that can function as a centralized repository for validation output.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A validation method comprising the steps of:

identifying a host within a first grid of a grid environment currently unassociated with a ghost agent, wherein said host is a software object operating in the first grid, and wherein said grid environment comprises at least two distinct grids;

associating a ghost agent in the first grid with said host, wherein the ghost agent is a software object configured to replicate actions of an associated host software object and record data related to the replicated actions of the associated host software object;

comparing the recorded data related to said replicated actions with validation data;

generating a validation output based upon said comparing step;

moving said host from the first grid to a second grid within said grid environment; and, in response to moving said host to said second grid, moving said associated ghost agent from said first grid to said second grid within said grid environment so as to follow movements of said host within the grid environment and to permit the ghost agent to replicate actions of said host in said second grid and record data related to said replicated actions in said second grid.

2. The method of claim 1, further comprising the steps of:

inputting at least one performance specification into said ghost agent, wherein said validation data comprises said performance specification; and, determining at least one performance metric for at least one of said replicated actions, wherein said comparing step compares said performance metric with said performance specification.

3. The method of claim 1, further comprising the steps of:

inputting at least one resource utilization specification into said ghost agent, wherein said validation data comprises said resource utilization specification; and, determining at least one resource utilization metric for at least one of said replicated actions, wherein said comparing step compares said resource utilization metric with said resource utilization specification.

4. The method of claim 1, further comprising the steps of:
inputting at least one load specification into said ghost agent, wherein said validation data comprises said load specification; and,
determining at least one load metric resulting from the execution of at least one of said replicated actions, wherein said comparing step compares said load metric with said load specification.

5. The method of claim 1, further comprising the steps of:
executing a test routine;
generating test output for said test routine, wherein said validation data comprises said test output; and,
determining output for at least one of said replicated actions, wherein said comparing step compares said replicated action output with said test output.

6. The method of claim 5, further comprising the steps of:
inputting said test routine into said ghost agent; and,
executing said test routine within said ghost agent.

7. The method of claim 1, further comprising the steps of:
identifying a location for recording validation output that is external to said ghost agent; and,
conveying said validation output to said identified location.

8. The method of claim 1, further comprising the steps of:
receiving a validation command from a source external to said host and external to said ghost agent; and,
performing at least one operation with said ghost agent responsive to said validation command.

9. The method of claim 1, further comprising the steps of:
selecting a plurality of hosts; and,
for each selected host, repeating said associating step, said replicating step, said comparing step, and said generating step.

* * * * *